May 14, 1946.  A. MURRAY  2,400,366
PHOTOGRAPHIC SUPPORT
Filed Jan. 6, 1945  2 Sheets-Sheet 1
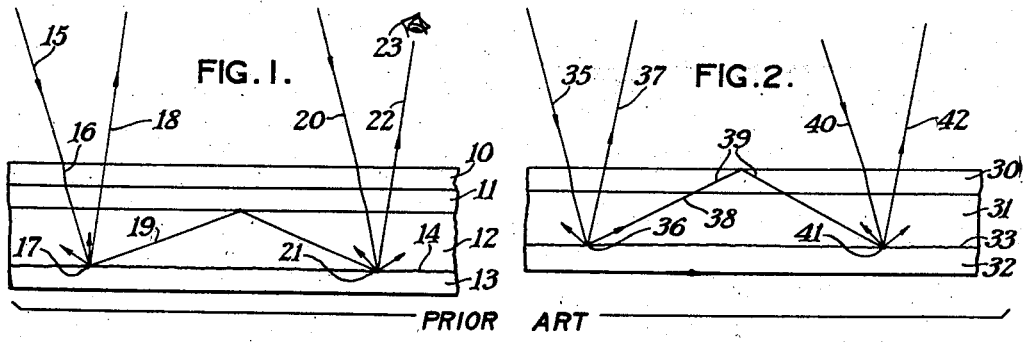
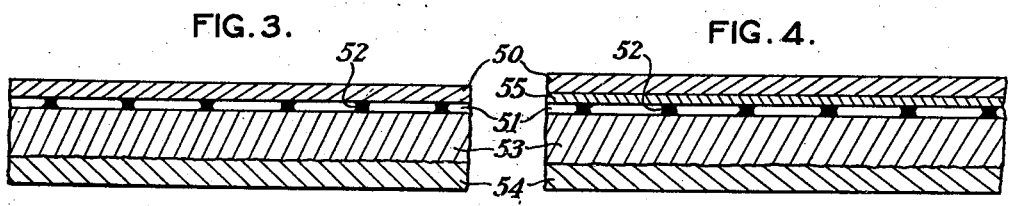
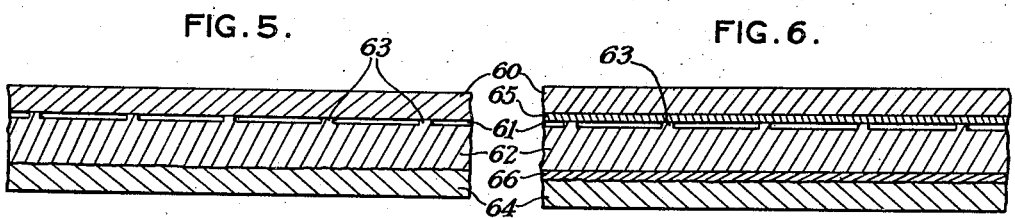
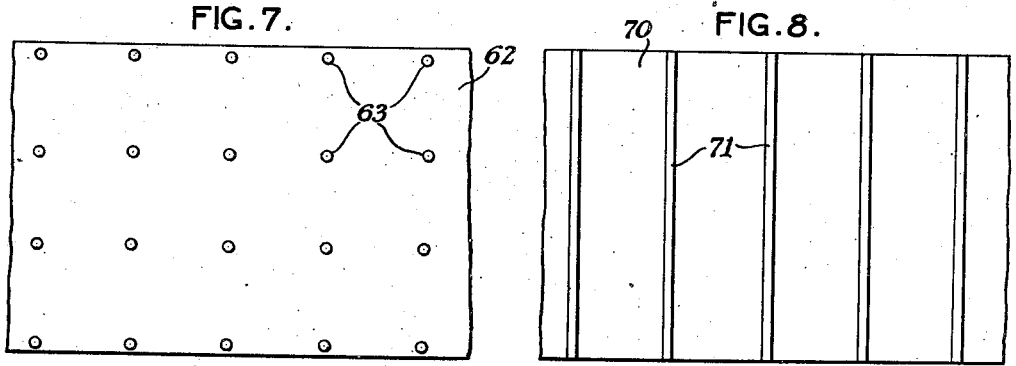
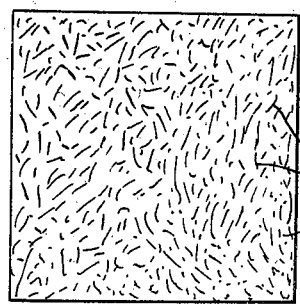
ALEXANDER MURRAY
INVENTOR
BY
ATT'Y & AG'T May 14, 1946.   A. MURRAY   2,400,366
PHOTOGRAPHIC SUPPORT
Filed Jan. 6, 1945   2 Sheets-Sheet 2

ALEXANDER MURRAY
*INVENTOR*
BY
ATT'Y & AGT

Patented May 14, 1946

2,400,366

UNITED STATES PATENT OFFICE 2,400,366

PHOTOGRAPHIC SUPPORT

Alexander Murray, Rochester, N. Y., assignor to Eastman Kodak Company, Rochester, N. Y., a corporation of New Jersey Application January 6, 1945, Serial No. 571,662

20 Claims. (Cl. 95—8)

This invention relates to photographic supports particularly those used for photographic color prints. This is a continuation in part of Serial Number 493,367, filed July 3, 1943.

In a copending application, Serial No. 576,230, filed February 5, 1945, W. T. Hanson, Jr., and R. M. Evans describe the advantages in color photography when an airspace is introduced between a light diffusing support and the image bearing layer.

It is the object of the present invention to provide a simple practical and useful method of producing such an airspace. It is also an object of the invention to provide a color print having an airspaced support.

The purpose of this continuation in part application is to include certain limitations as to the thickness of the airspace which are inherent in the invention and which distinguish over prior arrangements which actually have nothing to do with the present invention. For example U. S. Patent 315,703, Bencke et al., shows a picture layer airspaced from a diffusing layer in order to get a softened appearance due to halation which is exactly opposite to the purpose and effect of the present invention. In the Bencke arrangement, the separation of the picture layer and the diffusing layer is very large, many times the total thickness of ordinary photographic papers so that the scattered light reduces the detail contrast, the sharpness, and the color saturation of the picture giving a softened or "porcelain" appearance. Even in ordinary photographic prints in which the diffusing layer is attached to the picture layer, this effect is not present. For convenience the scattering of light in the Bencke et al. arrangement may be referred to as "primary halation" in which case it should be noted that the effect of "primary halation" in ordinary photographic prints is negligible since the spreading of light thereby is less than the minimum detail of the picture anyway.

However, in ordinary color prints, there is what may be termed "secondary halation" due to multiple internal reflections within the picture layer. This secondary or residual halation is removed by the present invention. The present invention would have no value in any arrangement having an objectionable degree of primary halation. If the separation of the picture and diffusing layers were made greater than 5/1000 of an inch, primary halation due to the Bencke effect would counteract the function of the present invention rendering it inoperative. Preferably this separation should be less than 1/1000 of an inch. Since the airspace must be equal to or less than this separation, these values also constitute the upper limits of the airspace thickness.

The airspace according to the present invention can have any thickness less than that just specified but of course there must be some airspace. Optical contact or even thicknesses less than one or two wave lengths of light introducing interference patterns would not allow the invention to operate properly, but mechanical contact at scattered points, as with a rough or textured surface would still permit the operation of the present invention quite satisfactorily. The intermediate areas of course are separated more than one or two wave lengths of light. Therefore, the present invention requires the airspace (or other low index medium) to have a thickness greater than .00005 inch and since the separation of the picture and diffusing layers is equal to or greater than the airspace, this is the lower limit of the separation. Thus both the airspace and the separation of the picture and diffusing layers must be between .00005 inch and .005 inch preferably less than .001 inch.

Other objects and advantages of the invention will be apparent from the following description when read in connection with the accompanying drawings, in which:

Figs. 1 and 2 illustrate the theory of the airspaced support;

Figs. 3 to 9 illustrate in section or plan various embodiments of the invention.

Figure 10:
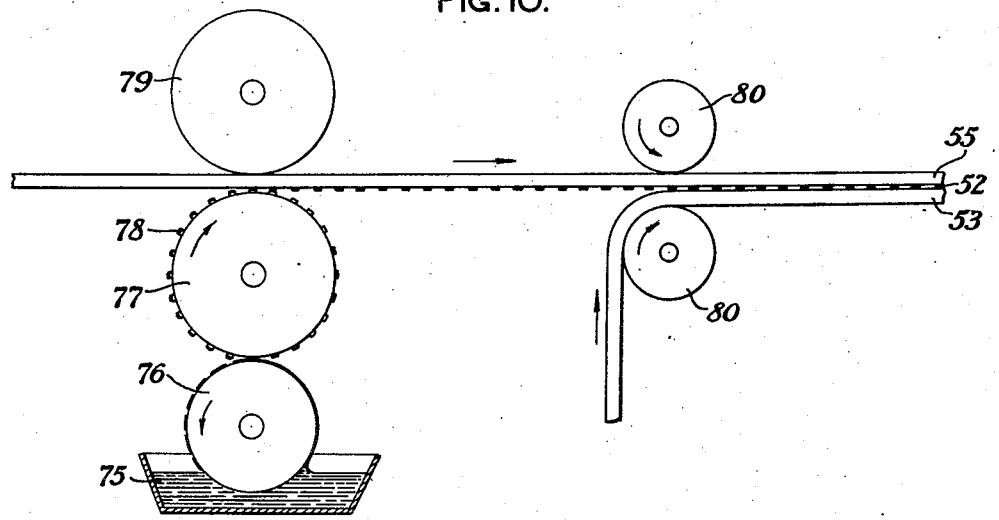
Figs. 10 and 11 illustrate steps in the methods of preparing the supports illustrated in Figs. 3 to 9.

In Fig. 1 an image bearing layer 10 is separated by an airspace 11 from a light diffusing support such as paper or film containing a translucent pigment. For simplification this support is represented by a transparent layer 12 and a translucent layer 13, the diffusion being assumed to take place at the interface 14. Of course the layer 12 may be infinitesimal in thickness or the light diffusion may be distributed throughout the support.

Light represented by a ray 15 strikes the diffusing surface 14 at the point 17 and is diffused. Part of this light as represented by the ray 18 passes back through the color layer 10. Light diffused at high obliquity such as indicated by the rays 19 may be totally and internally reflected within the layer 12 and strikes the diffusing surface 14 again at the point 21. A ray 20 may also strike this point 21 directly and, of course, is much more intense than the ray 19. However, light from the point 21 is made up of two parts the major portion of which came from the ray 20. Part of this as shown by the ray 22 passes to the eye 23 of an observer who at the moment is examining a portion of the image in a layer 10 adjacent to the point 21. This ray 22 will be mainly colored by the portion of the layer 10 near the point 21 because the extraneous ray 19 is not highly colored since it passed through the layer 10 only once and then practically directly through as indicated by the portion 16.

However, according to the prior art as shown in Fig. 2 an extraneous light striking the point 36 is diffused to send a ray 37 directly back and a highly oblique ray 38 passes, as shown by the portions 39, obliquely and hence through a thick portion of the color layer 30 before it strikes a second point of diffusion 41. Although this ray 38 forms only a small portion of the light in the ray 42 compared with the primary illuminating ray 40 this extraneous ray 38 may be highly colored and cause highlight stain if the region of the image 30 adjacent to the point 41 happens to be a highlight. Thus the airspace 11 of Fig. 1 increases the brilliance and decreases the highlight stains of a color print. This is all described by Hanson and Evans in the above-mentioned application.

According to the present invention the airspace is produced by having the picture bearing layer together with any intermediate layers that may be necessary separated from the light diffusing support by air, but attached thereto by occasional contact areas each of which has a width less than 1/20 of an inch and the area of contact being less than 10% of the total area. Such an arrangement may be in the form of a halftone pattern such as halftone dots or lines or may be in the form of a texture which is especially useful when larger contact areas are desired which are, however, only unobtrusively apparent.

In Fig. 3 the image bearing layer 50 is separated by an airspace 51 from a transparent layer 53 and a light diffusing layer 54. The layer 50 is supported by adhesive spots 52 on the layer 53.

In the antihalation embodiment of the invention the layer 50 is a sensitive emulsion and is the light diffusing one; the layers 53 and 54 are both transparent.

Fig. 4 differs from Fig. 3 by the inclusion of a pellicle layer 55 as part of the image bearing layer which has the advantage that the support consisting of the pellicle layer 55, the layer 51 with adhesive spots 52 and the layers 53 and 54 can be prepared separately before the sensitive layer 55 is applied thereto.

Figs. 5 and 6 are similar to 3 and 4, the picture layer being 60, the airspace being 61, the support being made up of transparent layer 62 and a translucent layer 64. The contact areas in this case are in the form of relief spots 63 on the layer 62, the image bearing layer being supported only by the tops of the elemental spots. In Fig. 6 an additional pellicle 65 forms part of the image bearing layer and a layer 66 of cement is shown between the layer 62 and the layer 64. The layers 65 and 62 as mounted form a unit which can be added to any translucent support before the color picture or sensitive layer is added to the surface thereof.

As with Fig. 3, these Figs. 5 and 6 are also representative of the antihalation form of the invention in which the front layer 60 is a sensitive emulsion and the support layer or layers 62 and 64 are transparent.

Figs. 3 to 6 are cross sectional views for either the embodiment shown in Fig. 7 or that shown in Fig. 8. Fig. 7 is specifically shown as a plan view of the element 62 of the Fig. 5. In Fig. 8, a similar element 70 has parallel ridges 71. I have found it desirable to use a halftone screen pattern such as either of these, in which there are at least 10 lines to the inch, or in the case of small prints, possibly 60 or 100 or even more lines per inch. In any case the width of the supporting areas should be less than 1/20 of an inch and the area should be less than 10% of the total area.

Fig. 9 is representative of various texture arrangements of the support pattern. For example, the texture may be that of linen, tapestry, silk, lace, burlap, reticulation pattern, or the grain of coarse paper. The use of a texture has the advantage that a relatively large pattern can be employed which is quite visible, especially with small prints, but is still unobtrusive. The main support 72 is provided with ridges or other contact areas 73 which constitute the pattern or texture.

In each of the figures the front interface of the low index or airlayer is smooth, substantially parallel to the front surface of the picture layer and non-diffusing. If this interface were diffusing as it probably is in the Bencke arrangement referred to above, the primary halation would be extended and also there would no longer be complete elimination of the secondary halation as by the present invention.

In my copending application, Serial No. 571,661, filed concurrently herewith, I have described a modification of the present invention which does not require the contact areas to be less than 10% of the total area, although they are still preferably less than 50% for each set of contact areas, two such sets being used in successive layers, but out of register so that effectively there is a 100% airspace.

Fig. 10 illustrates one method of making the support and hence the whole photograph illustrated in Fig. 4. An adhesive 75 is picked up by a drum 76 and applied thereby to the tops of relief areas 78 on a drum 77. These areas are shown large for clarity, but in practice are quite small. A transparent pellicle 55 moves over the drum 77 being held in contact therewith by a pressure roller 79 and this pellicle 55 picks up, from the relief area 78, adhesive spots 52. The pellicle 55 and adhesive spots 52 are then pressed into contact with a layer 53 between pressure rollers 80. This results in the arrangement shown as interlayers in the cross section of Fig. 4.

Figure 11:
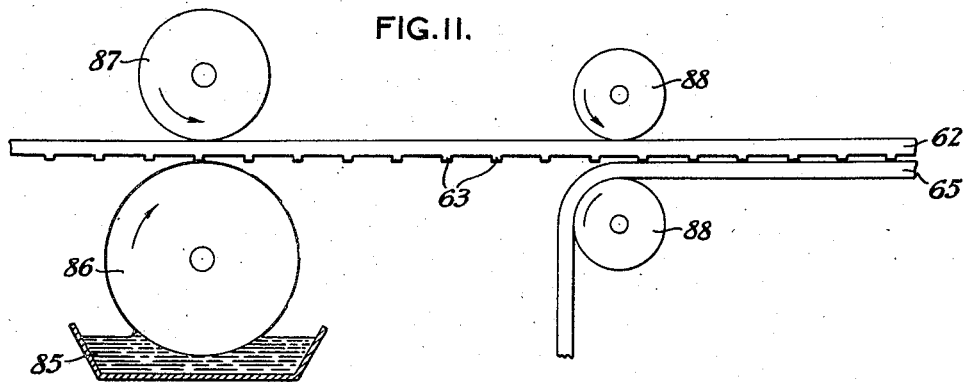

Fig. 11 similarly shows the method of producing the combination of layers 65 and 62 shown in Fig. 6. The layer 62 is molded to have relief areas 63 projecting from one surface thereof. The tops of these relief areas are provided with adhesive 85 by means of a drum 86 and pressure roller 87. The pellicle 65 is then pressed into contact with the tops of the relief areas 63 by means of pressure rollers 88. The resulting unit consisting of layers 62 and 65 with an airspace is useful both in the manufacture of supports for prints and also for transparent sensitive film since the airspace acts to reduce halation.

The airspace support is thus particularly useful with a sensitive photographic material since it reduces halation and with finished color prints since it reduces highlight stain and improves color saturation. Both of these effects are obtained, when the sensitive film is intended for color photography and the final result is processed to a color print.

By way of examples, it is pointed out that a halftone dot pattern, say 150 lines per inch which will not be detectable to the unaided eye, is imprinted, transferred or offset all over the surface to be treated. The ink thus printed is, for example a flexible thermoplastic material or synthetic resin rendered solvent. Preferably the dots are of such a size on the plate that they occupy about 1% of the total area. The adhesive spreads somewhat in the printing operation. The solvent from the adhesive spots is allowed to evaporate after which the sheets can be rolled or piled and stored until required. When such a sheet is to be used in laminating a finished transparency containing a multi-color picture, onto paper or a light diffusing film, the transparency is rolled in contact with the prepared side of the support, between heated steel rolls at a temperature which is harmless to the colorants in the picture but which fuses the resin dots. The dots spread still further in the operation but reasonable control of the fusing temperature, which depends on the resin used, keeps the final area less than 10% of the total area thus permitting realization of at least 90% of the advantages of airspaced backing.

Still another example involves the making of a prefabrication airspaced printing stock, such as described in connection with Figs. 10 and 11 above. The white reflecting base which may be paper, white pigmented plastic sheet, translucent glass, porcelain, or enameled metal sheets, is used for a base and separated from this base by a thin airspace occupying the major portion of the total area is a transparent layer or pellicle or Cellophane, synthetic or natural plastic sheet, gelatin, etc., the lamination or fastening to the reflected base is provided by dispersed areas, e. g. glues, gelatin, casein, pitch wax, natural or synthetic resins or gums, rubber, cellulosic esters, etc., so distributed that the adhering regions produce optical contact over only a minor fraction of the total picture area. These adhesives may of course be plasticized with glycerol, glycols, polyglycerols, oils, soft resins or pitches, high boiling synthetic plasticizers such as tricresylphosphate or isoamylphthalate. The adhesive which is applied either to the reflecting base or to the transparent sheet or even to both is distributed by any of the usual photomechanical printing processes such as offsetting or transferring from a plate or cylinder form, or by spraying from an atomizer arranged to deposit only dispersed areas of adhesive. Alternatively, the fluid adhesive may be applied on a receiving surface arranged with a high wetting angle so that the adhesive forms small discrete droplets which dry or set in discrete areas or on the other hand, the adhesive may be in the form of globules dispersed in a fluid which is flowed over the surface, the continuous phase of the fluid containing a quantity of colloid drying to a thin layer on the surface whereas the globules are relatively thick and constitute the adhesive at which the only optical contact is made between the laminated sheets.

Having thus described various embodiments of my invention, I wish to point out that it is not limited to these structures but is of the scope of the appended claims.

I claim:

1. A photographic color print comprising a layer containing a multicolor picture, a light diffusing support for the picture layer and between the support and the picture layer an airspace with occasional contact areas between the picture layer and the support which contact areas have a width less than one twentieth of an inch and have an area of contact less than 10% of the total area, the separation of the picture layer and the diffusing support and the thickness of the airspace both being between .00005 inch and .005 inch.

2. A photographic color print according to claim 1 in which the contacts are dots distributed according to a halftone screen pattern with more than 100 to the square inch.

3. A photographic color print according to claim 1 in which the contacts are distributed according to a texture pattern.

4. A photographic color print according to claim 1 in which the contacts are relatively narrow parallel lines separated by relatively wide spaces.

5. A photographic color print comprising a transparent layer containing a multicolor picture and a light diffusing support for the layer, the support and layer being attached only by adhesive spots less than one twentieth of an inch in width and having an area less than 10% of the total area, whereby there is effectively an airspace between the layer and the support, the separation of the picture layer and the diffusing support and the thickness of the airspace both being between .00005 inch and .005 inch.

6. A photographic color print according to claim 5 in which between the adhesive spots and the picture layer, there is an additional pellicle layer adhering uniformly to the picture layer.

7. A photographic color print comprising a transparent layer containing a multicolor picture and a light diffusing support for the layer, the surface of the support in contact with the layer having elemental areas in relief less than one twentieth of an inch wide and comprising less than 10% of the total area, the area of these relief elements being the only areas in intimate contact with the transparent layer, whereby an airspace is between the transparent layer and the support, the separation of the picture layer and the diffusing support and the thickness of the airspace both being between .00005 inch and .005 inch.

8. A photographic color print according to claim 7 in which an additional transparent pellicle is included as part of the transparent layer, between the image bearing part and the support.

9. A thin supporting layer for photographic records which comprises a light diffusing layer, a transparent pellicle attached to the layer only at distributed areas of contact less than 10% of the total area and each less than one twentieth of an inch wide, the airspace between the layer and the pellicle having a thickness between .00005 and .005 inch.

10. A thin supporting layer for a photographic record comprising a light diffusing layer and a transparent pellicle adhered to the layer only by elements of adhesive covering less than 10% of the total area, the airspace between the layer and the pellicle having a thickness between .00005 and .005 inch.

11. A thin supporting layer for a photographic record comprising a light diffusing layer, the top surface of which has elemental areas in relief covering less than 10% of the total area and a thin transparent pellicle adhering only at the top of the elemental areas, the airspace between the layer and the pellicle having a thickness between .00005 and .005 inch.

12. A light sensitive material comprising a support according to claim 9 and a sensitive layer on the pellicle.

13. A light sensitive material comprising a support according to claim 10 and a sensitive layer on the pellicle.

14. A light sensitive material comprising a support according to claim 11 and a sensitive layer on the pellicle.

15. The method of preparing a support for a photographic record which comprises printing adhesive according to a halftone screen pattern onto a layer of a light-diffusing support, the adhesive covering less than 10% of the total area and fastening a thin transparent pellicle to the layer only by said adhesive, with an airspace between the layer and the pellicle having a thickness between .00005 and .005 inch except at said adhesive areas.

16. The method of preparing a support for a photographic record which comprises forming a light diffusing layer with elemental areas in low relief less than 10% of the total area on one surface thereof and fastening a thin transparent pellicle only to the tops of said elemental areas, with an airspace between the layer and the pellicle having a thickness between .00005 and .005 inch except at said elemental areas.

17. A thin supporting layer for photographic records comprising two transparent pellicles attached to each other only at distributed areas of contact less than 10% of the total area and each less than one twentieth of an inch wide, the airspace between the pellicles having a thickness between .00005 and .005 inch and a light diffusing layer attached to the outside of one of the pellicles.

18. A photographic sheet material comprising a transparent layer, a light diffusing layer and between the two layers an airspace with a thickness between .00005 and .005 inch and with occasional contact areas which have a width less than one twentieth of an inch and which have an area less than 10% of the total area.

19. A sheet material according to claim 18 in which the transparent layer contains a multicolored picture and the light diffusing layer is a support for the picture.

20. A sheet material according to claim 18 in which the light diffusing layer is a sensitive emulsion and the transparent layer is a support for the emulsion.

ALEXANDER MURRAY.